(12) United States Patent
Mao et al.

(10) Patent No.: US 12,730,306 B2
(45) Date of Patent: Sep. 8, 2026

(54) MULTI-FOCAL PICTURE GENERATION APPARATUS, HEAD-UP DISPLAY APPARATUS, RELATED METHOD, AND DEVICE

(71) Applicant: Shenzhen Yinwang Intelligent Technologies Co., Ltd., Shenzhen (CN)

(72) Inventors: Lei Mao, Dongguan (CN); Yunfei Yan, Dongguan (CN); Liangjia Zong, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 592 days.

(21) Appl. No.: 18/055,011

(22) Filed: Nov. 14, 2022

(65) Prior Publication Data

US 2023/0074131 A1 Mar. 9, 2023

Related U.S. Application Data

(63) Continuation of application No. PCT/CN2021/081944, filed on Mar. 20, 2021.

(30) Foreign Application Priority Data

May 15, 2020 (CN) ......................... 202010413996.4

(51) Int. Cl.
*G02B 27/01* (2006.01)

(52) U.S. Cl.
CPC .. *G02B 27/0101* (2013.01); *G02B 2027/0127* (2013.01)

(58) Field of Classification Search
CPC ..... G02B 27/00–648; G02B 2027/0105–0198; G03B 21/00–64; H04N 9/31–3197
See application file for complete search history.

(56) References Cited

U.S. PATENT DOCUMENTS

2007/0279618 A1 12/2007 Sano et al.
2016/0003636 A1 1/2016 Ng-Thow-Hing et al.
2017/0329143 A1 11/2017 Svarichevsky et al.
(Continued)

FOREIGN PATENT DOCUMENTS

CN 101416096 A 4/2009
CN 103268055 A 8/2013
(Continued)

*Primary Examiner* — Christopher A Lamb, II
(74) *Attorney, Agent, or Firm* — Leydig, Voit & Mayer, Ltd.

(57) ABSTRACT

A multi-focal picture generation apparatus, a head-up display apparatus, a related method, and a device are provided. The multi-focal picture generation apparatus includes a picture generation unit, an optical splitter, and a focal length adjuster. The picture generation unit is configured to generate a first focal plane of the multi-focal picture generation apparatus. The optical splitter is configured to: perform optical splitting on the picture generation unit, and irradiate a light beam obtained through optical splitting onto a surface of the focal length adjuster. The focal length adjuster is configured to perform focal length adjustment on the light beam irradiated onto the surface of the focal length adjuster, to generate a second focal plane of the multi-focal picture generation apparatus.

13 Claims, 9 Drawing Sheets

(56) References Cited

U.S. PATENT DOCUMENTS

| | | | | |
|---|---|---|---|---|
| 2018/0314065 | A1* | 11/2018 | Li | G02B 27/0103 |
| 2019/0116344 | A1 | 4/2019 | Nguyen et al. | |
| 2019/0265468 | A1 | 8/2019 | Hirata et al. | |
| 2019/0302464 | A1 | 10/2019 | Li | |
| 2019/0331916 | A1 | 10/2019 | Yuan | |
| 2019/0384059 | A1 | 12/2019 | Meijering et al. | |
| 2020/0201036 | A1* | 6/2020 | Hong | B60R 1/31 |
| 2021/0208391 | A1* | 7/2021 | Fan-Chiang | G03B 21/62 |
| 2021/0360209 | A1* | 11/2021 | Ma | G02B 27/0101 |

FOREIGN PATENT DOCUMENTS

| | | | |
|---|---|---|---|
| CN | 103376551 | A | 10/2013 |
| CN | 104932104 | A | 9/2015 |
| CN | 105607393 | A | 5/2016 |
| CN | 105785569 | A | 7/2016 |
| CN | 107329256 | A | 11/2017 |
| CN | 207366832 | U | 5/2018 |
| CN | 108139584 | A | 6/2018 |
| CN | 207752239 | U | 8/2018 |
| CN | 109076208 | A | 12/2018 |
| CN | 104512336 | B | 3/2019 |
| CN | 113671699 | A | 11/2021 |
| CN | 113671702 | A | 11/2021 |
| EP | 2960095 | B1 | 6/2019 |
| JP | 2013032087 | A | 2/2013 |
| JP | 2014181025 | A | 9/2014 |
| JP | 2017056844 | A | 3/2017 |
| JP | 2017181644 | A | 10/2017 |
| KR | 20180025130 | A | 3/2018 |
| KR | 20200004579 | A | 1/2020 |
| WO | 2004038457 | A2 | 5/2004 |
| WO | 2014024745 | A1 | 2/2014 |
| WO | 2015190157 | A1 | 12/2015 |
| WO | 2019164745 | A1 | 8/2019 |

* cited by examiner

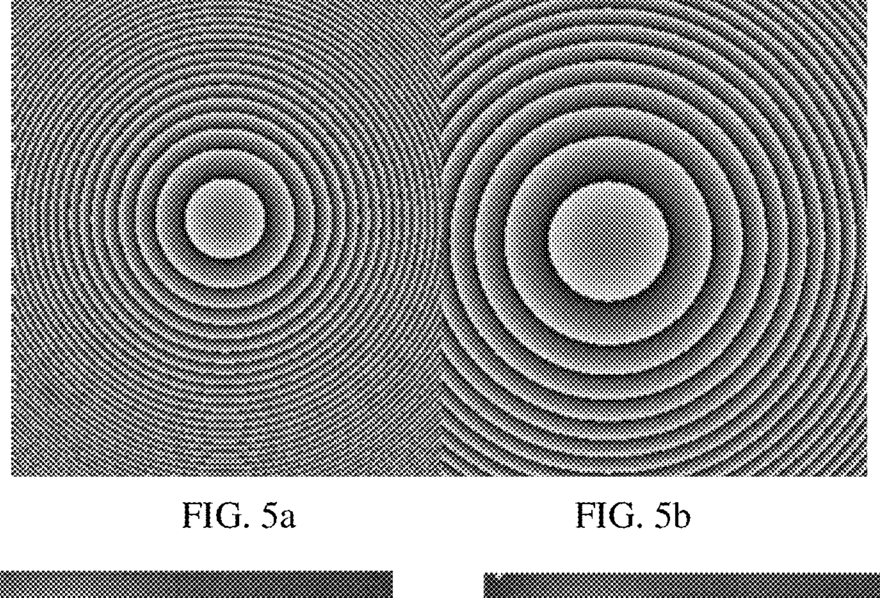
FIG. 5a FIG. 5b
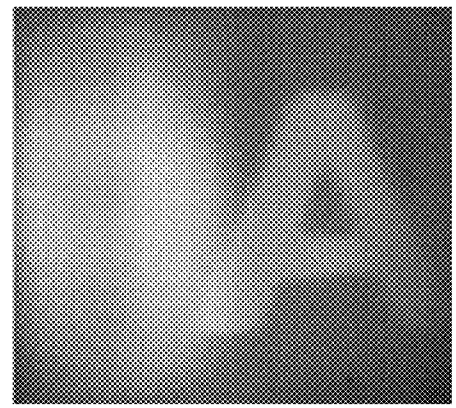
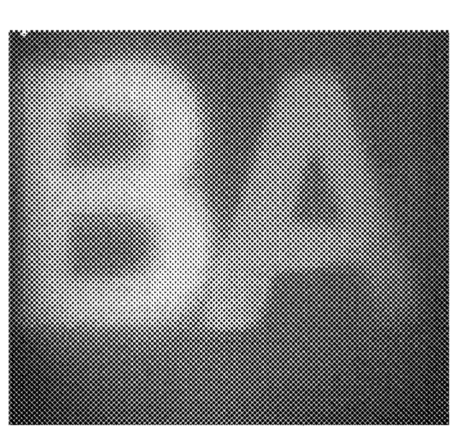
FIG. 6a
FIG. 6b

MULTI-FOCAL PICTURE GENERATION APPARATUS, HEAD-UP DISPLAY APPARATUS, RELATED METHOD, AND DEVICE

CROSS-REFERENCE TO RELATED APPLICATIONS

This application is a continuation of International Application No. PCT/CN2021/081944, filed on Mar. 20, 2021, which claims priority to Chinese Patent Application No. 202010413996.4, filed on May 15, 2020. The disclosures of the aforementioned applications are hereby incorporated by reference in their entireties.

TECHNICAL FIELD

This application relates to the field of picture display technologies, and in particular, to a multi-focal picture generation apparatus, a head-up display apparatus, and a related method.

BACKGROUND

A head-up display (Head-up display, HUD), also referred to as a parallel display system, is a driver-centered multi-functional dashboard. The head-up display is used to project important driving information, such as a speed per hour and navigation, onto a windshield in front of a driver, so that the driver can view the important driving information, such as the speed per hour and the navigation, as much as possible without lowering or turning the head. FIG. 1 is a schematic diagram of a display interface of an HUD. As shown in FIG. 1, a picture displayed on the HUD includes information, such as a speed per hour "4 km/h" and navigation "a 20 m right turn arrow".

However, because a picture displayed on a common HUD and an object on an actual road are not on a same focal plane, the sight of a driver needs to switch back and forth between the object on the road and an imaging plane of the HUD, to adjust a focus of the eye. Although a current HUD resolves a head lowering problem, frequent focus adjustment also causes visual fatigue, degrading user experience. To implement an HUD that is truly based on augmented reality (Augmented reality, AR), it is necessary to resolve a technical problem of multi-focal plane imaging of a picture generation apparatus.

SUMMARY

This application provides a multi-focal picture generation apparatus, a head-up display apparatus, and a related method, mainly to resolve a technical problem of multi-focal plane imaging of the picture generation apparatus, and implement continuous adjustability of any focal length.

According to a first aspect, this application provides a multi-focal picture generation apparatus. The apparatus includes a picture generation unit, an optical splitter, and a focal length adjuster. The picture generation unit is configured to generate a first focal plane of the multi-focal picture generation apparatus; the optical splitter is configured to: perform optical splitting on the picture generation unit, and irradiate a light beam obtained through optical splitting onto a surface of the focal length adjuster; and the focal length adjuster is configured to perform focal length adjustment on the light beam irradiated onto the surface of the focal length adjuster, to generate a second focal plane of the multi-focal picture generation apparatus.

In the technical solution of this application, a focal length position is flexibly adjusted by using the focal length adjuster, so that continuous adjustability of any focal length can be implemented, and any quantity of focal planes (or imaging planes) and a focal plane at any position can be implemented.

In a possible implementation, different phase information is loaded onto the focal length adjuster, to enable the multi-focal picture generation apparatus to generate a plurality of second focal planes, where the different phase information corresponds to different second focal planes.

In the technical solution of this application, phase information is loaded onto the focal length adjuster to adjust a focal length, to control a focal plane quantity and position, thereby achieving relatively high flexibility.

In a possible implementation, the focal length adjuster includes a plurality of imaging areas, and different imaging areas correspond to different second focal planes. An imaging area of the focal length adjuster may be divided by using software, supports any boundary shape, and has high flexibility.

In a possible implementation, different phase information is loaded in the different imaging areas. The different phase information is loaded in the different imaging areas, so that pictures on different focal planes can be displayed in different areas.

In a possible implementation, the picture generation unit includes a light source, and the optical splitter is configured to split a light beam generated by the light source. Upgrading and alteration may be performed based on an optical path of the picture generation unit, so that implementation is easy.

In a possible implementation, when the second focal plane includes two focal planes, a position of one second focal plane is fixed, and a position of the other second focal plane is adjustable. When the second focal plane includes a plurality of focal planes, positions of any one or more focal planes may be randomly adjusted, to construct an adjustable bifocal plane or multi-focal plane.

In a possible implementation, the phase information loaded onto the focal length adjuster includes phase distribution of a Fresnel lens or phase distribution of a Zernike lens. An equivalent lens focal length may be changed by changing a phase distribution pattern that is of the Fresnel lens or the Zernike lens and that is loaded onto the focal length adjuster, to control the multi-focal picture generation apparatus to generate a plurality of consecutive focal planes.

In a possible implementation, the focal length adjuster is a spatial light modulator. The spatial light modulator may be a phase-type spatial light modulator, and may be implemented based on liquid crystal or microelectromechanical systems.

According to a second aspect, this application provides a multi-focal picture generation method. The method may be applied to a multi-focal picture generation apparatus, and the multi-focal picture generation apparatus includes a picture generation unit, an optical splitter, and a focal length adjuster. The method includes: generating a first focal plane by using the picture generation unit; performing optical splitting on the picture generation unit by using the optical splitter, and irradiating a light beam obtained through optical splitting onto a surface of the focal length adjuster; and performing focal length adjustment on the light beam irradiated onto the surface of the focal length adjuster by using the focal length adjuster, to generate a second focal plane.

In the technical solution of this application, a focal length position is flexibly adjusted by using the focal length adjuster, so that continuous adjustability of any focal length can be implemented, and any quantity of focal planes (or imaging planes) and a focal plane at any position can be implemented.

In a possible implementation, the performing focal length adjustment on the light beam irradiated onto the surface of the focal length adjuster, to generate a second focal plane includes: loading different phase information onto the focal length adjuster, to generate a plurality of second focal planes, where the different phase information corresponds to different second focal planes.

In the technical solution of this application, phase information is loaded onto the focal length adjuster to adjust a focal length, to control a focal plane quantity and position, thereby achieving relatively high flexibility.

In a possible implementation, the method includes: dividing the focal length adjuster into a plurality of imaging areas, where different imaging areas correspond to different second focal planes. An imaging area of the focal length adjuster may be divided by using software, supports any boundary shape, and has high flexibility.

In a possible implementation, the method further includes: loading different phase information in the different imaging areas. The different phase information is loaded in the different imaging areas, so that pictures on different focal planes can be displayed in different areas.

In a possible implementation, the picture generation unit includes a light source, and a light beam generated by the light source is split by using the optical splitter. Upgrading and alteration may be performed based on an optical path of the picture generation unit, so that implementation is easy.

In a possible implementation, when the second focal plane includes two focal planes, the method includes: fixing a position of one second focal plane, and adjusting a position of the other second focal plane. When the second focal plane includes a plurality of focal planes, positions of any one or more focal planes may be randomly adjusted, to construct an adjustable bifocal plane or multi-focal plane.

In a possible implementation, the phase information loaded onto the focal length adjuster includes phase distribution of a Fresnel lens or phase distribution of a Zernike lens. An equivalent lens focal length may be changed by changing a phase distribution pattern that is of the Fresnel lens or the Zernike lens and that is loaded onto the focal length adjuster, to control the multi-focal picture generation apparatus to generate a plurality of consecutive focal planes.

In a possible implementation, the focal length adjuster is a spatial light modulator. The spatial light modulator may be a phase-type spatial light modulator, and may be implemented based on liquid crystal or microelectromechanical systems.

According to a third aspect, this application provides a head-up display apparatus. The head-up display apparatus includes the multi-focal picture generation apparatus according to any one of the first aspect or the possible implementations of the first aspect and an imaging component. The multi-focal picture generation apparatus is configured to generate a plurality of first pictures, where the multi-focal picture generation apparatus has a plurality of focal planes, and different focal planes correspond to different pictures in the plurality of first pictures. The imaging component is configured to perform imaging on the plurality of first pictures to generate a second picture, for receiving by a human eye.

In addition to being applied to the head-up display apparatus, the technical solution of this application may be applied to a display apparatus, such as a flat glass display or a projector. Continuously adjustable focal planes are generated by using a multi-focal picture unit, so that different information can be presented on different imaging planes, thereby improving user experience.

According to a fourth aspect, this application provides a driving device, including: an operator cabin, a windshield mounted in the operator cabin, and the head-up display apparatus according to the third aspect. The head-up display apparatus is mounted in the operator cabin, and the windshield performs reflection imaging on a second picture generated by the head-up display apparatus.

The technical solution of this application can resolve a technical problem of multi-focal plane imaging of an in-vehicle head-up display, so that a user does not need to frequently adjust a focus in a driving process, thereby improving user experience.

BRIEF DESCRIPTION OF THE DRAWINGS

FIG. 5*a* and FIG. 5*b* are diagrams of phase distribution of Fresnel lenses according to this application;

FIG. 6*a* and FIG. 6*b* are schematic diagrams of bifocal plane imaging according to this application;

DETAILED DESCRIPTION OF ILLUSTRATIVE EMBODIMENTS

Embodiments of this application relate to a multi-focal picture generation apparatus, a head-up display apparatus, and a related method. The following provides detailed descriptions with reference to the accompanying drawings.

Figure 1:
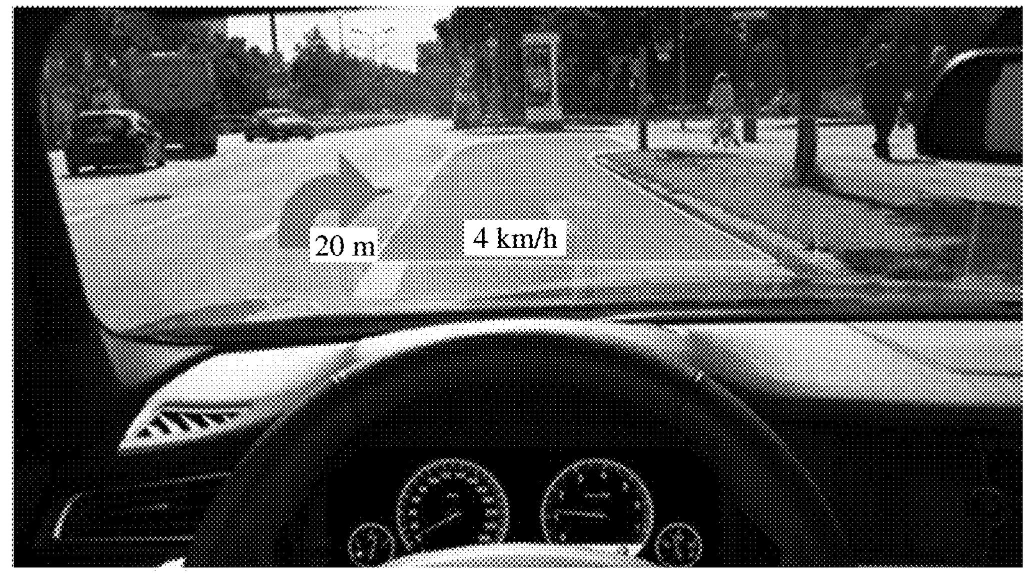
FIG. 1 is a schematic diagram of a display interface of an HUD.
Figure 2:
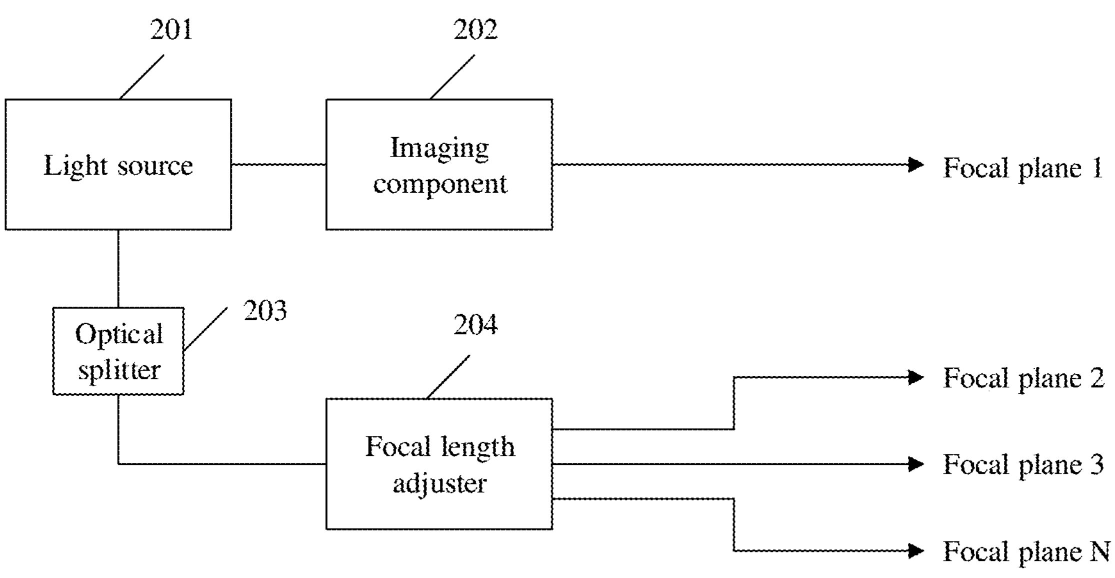
FIG. 2 is a schematic diagram of a structure of a multi-focal picture generation apparatus according to this application.

FIG. 2 is a schematic diagram of a structure of a multi-focal picture generation apparatus according to this application. As shown in FIG. 2, the multi-focal imaging apparatus includes a light source 201, an imaging component 202, an optical splitter 203, and a focal length adjuster 204. The light source 201 is configured to generate a light beam with a picture signal. The imaging component 202 may include a lens, a lens group, or the like, and perform imaging on the light beam generated by the light source 201, to generate a focal plane 1 of the multi-focal picture generation apparatus. The optical splitter 203 splits a part of the light beam off from the light source 201, and focal length adjustment is performed on the split light beam by using the focal length adjuster 204, so that the multi-focal picture generation apparatus has different focal planes (a focal plane 2, a focal plane 3, . . . , and a focal plane N), and the plurality of focal planes are continuously adjustable. The focal length adjuster 204 may be a spatial light modulator (SLM). A holographic phase image of any phase distribution is loaded onto the SLM, so that a focal plane position can be changed. In addition, the focal plane position may be alternatively changed by changing a light field amplitude, a polarization state, or the like of the SLM. According to the multi-focal picture generation apparatus in this application, continuous adjustability of any focal length can be implemented without changing a physical position of the imaging component in an optical path, to generate continuously variable imaging planes. The "focal plane" and the "imaging plane" in this application may indicate a same spatial position, in other words, a light beam imaging position. When a focal length of the SLM changes, a focal plane or an imaging plane accordingly changes.

Figure 3A:
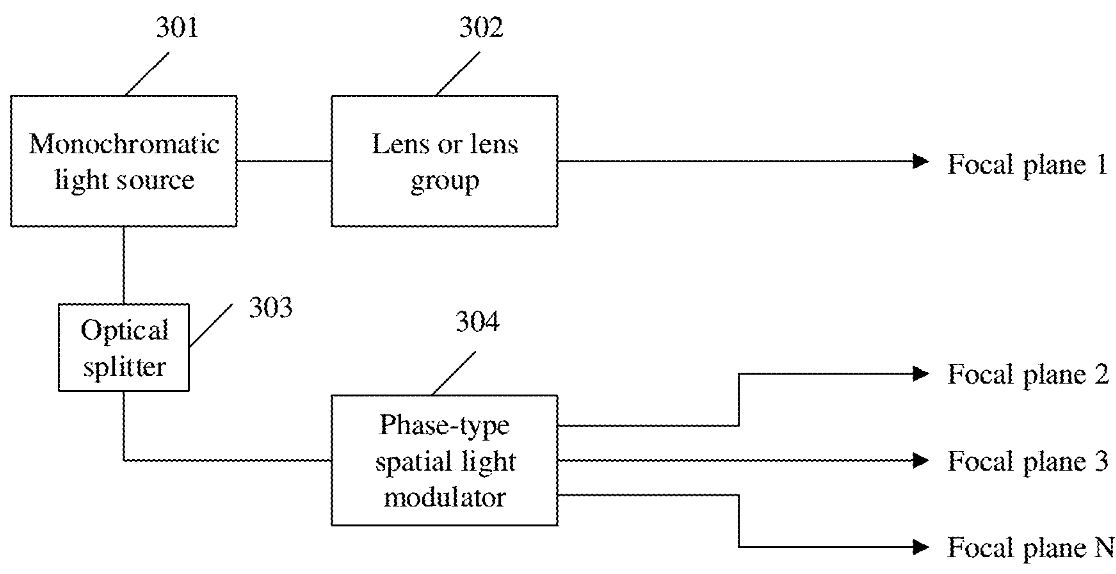
FIG. 3*a* to FIG. 3*c* are schematic diagrams of structures of three multi-focal picture generation apparatuses according to this application.
Figure 3B:
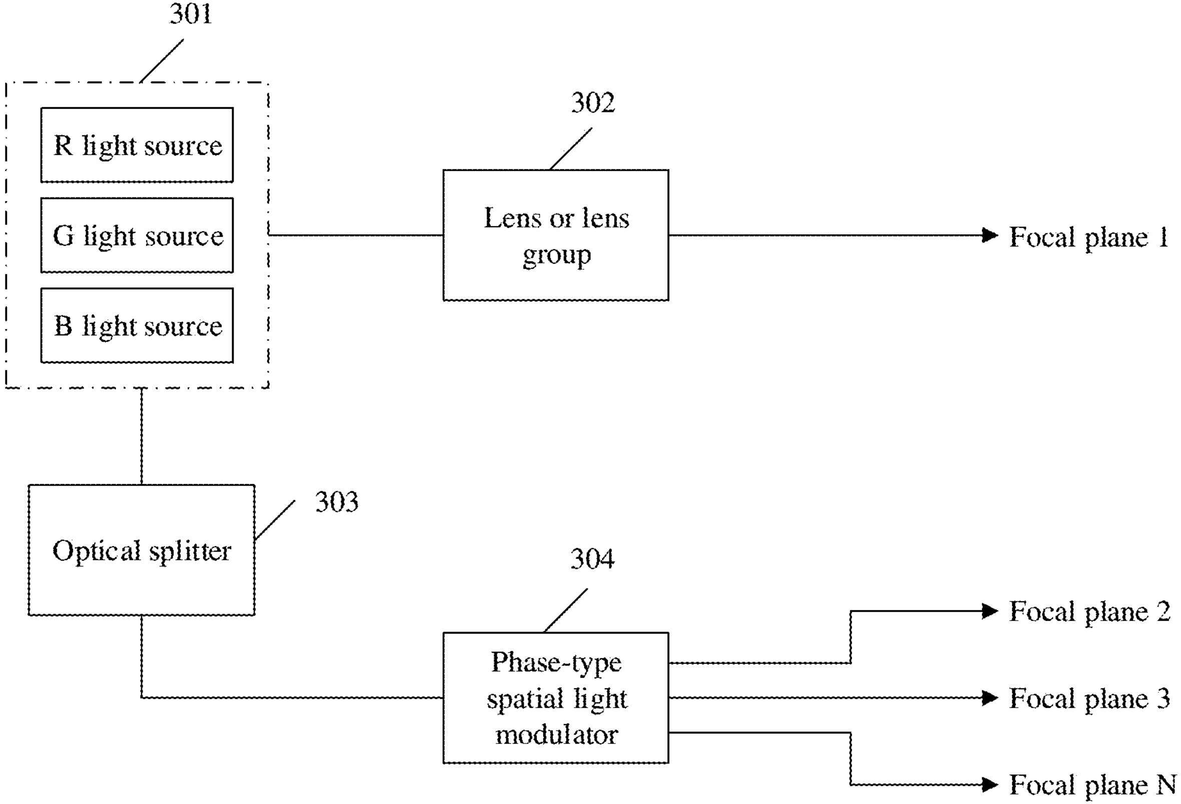
Figure 3C:
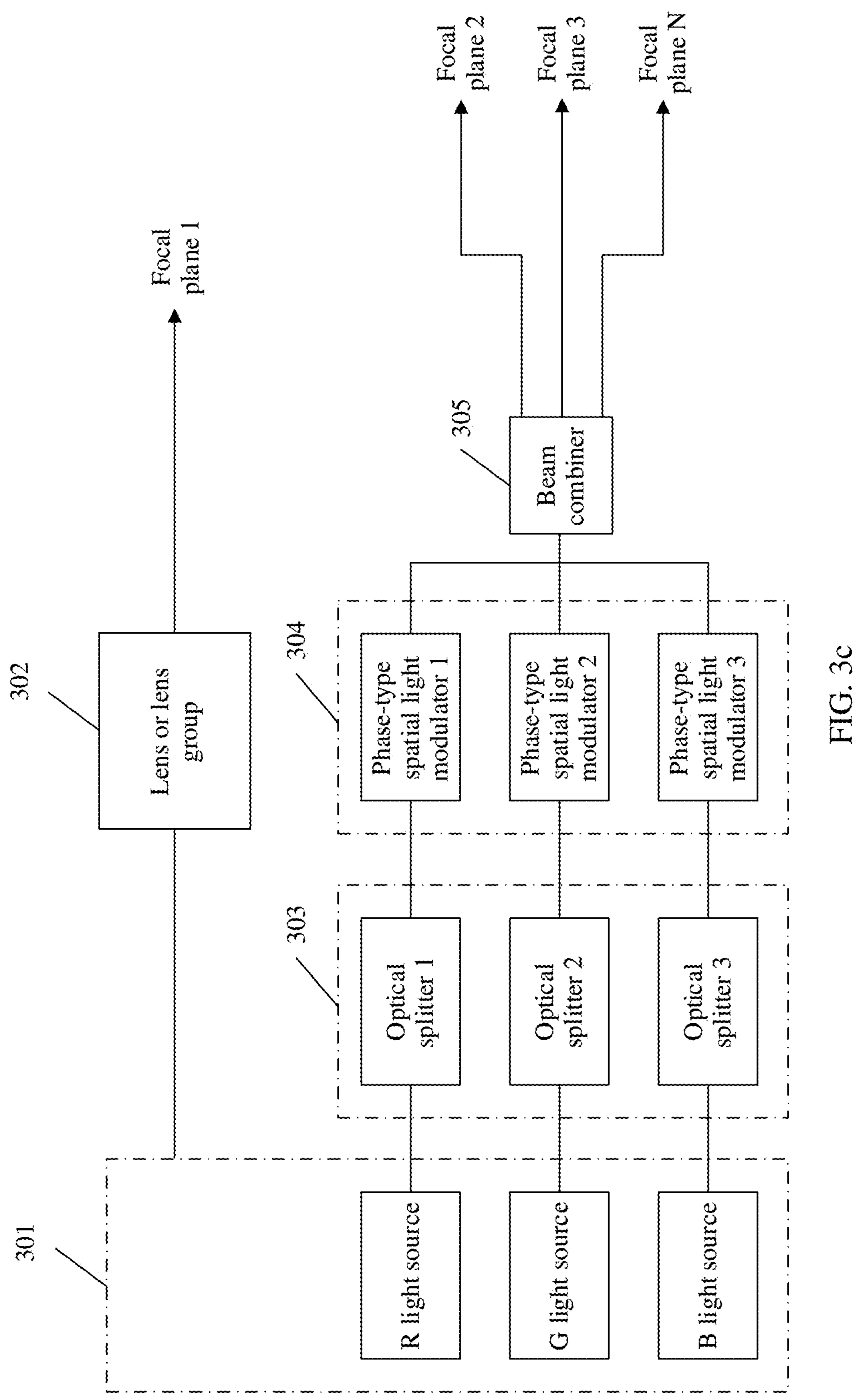

FIG. 3*a* to FIG. 3*c* are schematic diagrams of structures of three multi-focal picture generation apparatuses according to this application. As shown in FIG. 3*a*, based on the example in FIG. 2, the light source may be a monochromatic light source 301, the imaging component may be a lens or lens group 302, and the focal length adjuster may be a phase-type spatial light modulator 304. The lens or lens group 302 performs imaging on a light beam generated by the monochromatic light source 301, to generate a focal plane 1. The phase-type spatial light modulator 304 performs focal length adjustment on a light beam split off from the light source by an optical splitter 303, to generate a plurality of consecutive focal planes (a focal plane 2, a focal plane 3, . . . , and a focal plane N).

As shown in FIG. 3*b*, a difference from FIG. 3*a* lies in that the light source may be an R, G, and B tri-color light source 301. If the focal length adjuster is a single phase-type spatial light modulator 304, the phase-type spatial light modulator 304 may perform time division multiplexing with the R, G, and B tri-color light source 301. For example, the phase-type spatial light modulator 304 performs focal length adjustment on an R light source in the first second, performs focal length adjustment on a G light source in the second second, and performs focal length adjustment on a B light source in the third second. The phase-type spatial light modulator 304 performs focal length adjustment on any one of the R, G, and B monochromatic light sources at a same moment, to generate a plurality of consecutive focal planes (a focal plane 2, a focal plane 3, . . . , and a focal plane N).

As shown in FIG. 3*c*, a difference from FIG. 3*a* lies in that the light source may be an R, G, and B tri-color light source 301. If the focal length adjuster is three phase-type spatial light modulators 304, each phase-type spatial light modulator 304 may perform focal length adjustment on one of R, G, and B light sources. A phase-type spatial light modulator 1 performs focal length adjustment on the R light source, a phase-type spatial light modulator 2 performs focal length adjustment on the G light source, and a phase-type spatial light modulator 3 performs focal length adjustment on the B light source. After light beams emitted by the R, G, and B light sources are processed by the phase-type spatial light modulators 304, processed light beams may be combined by using a beam combiner 305, to generate a plurality of consecutive focal planes (a focal plane 2, a focal plane 3, . . . , and a focal plane N).

In embodiments of this application, alteration and upgrading may be implemented based on an optical path of the picture generation unit (picture generation unit, PGU), so that implementation is easy. The spatial light modulator adjusts a focal length to control a focal plane quantity and position, thereby achieving relatively high flexibility.

Figure 4A:
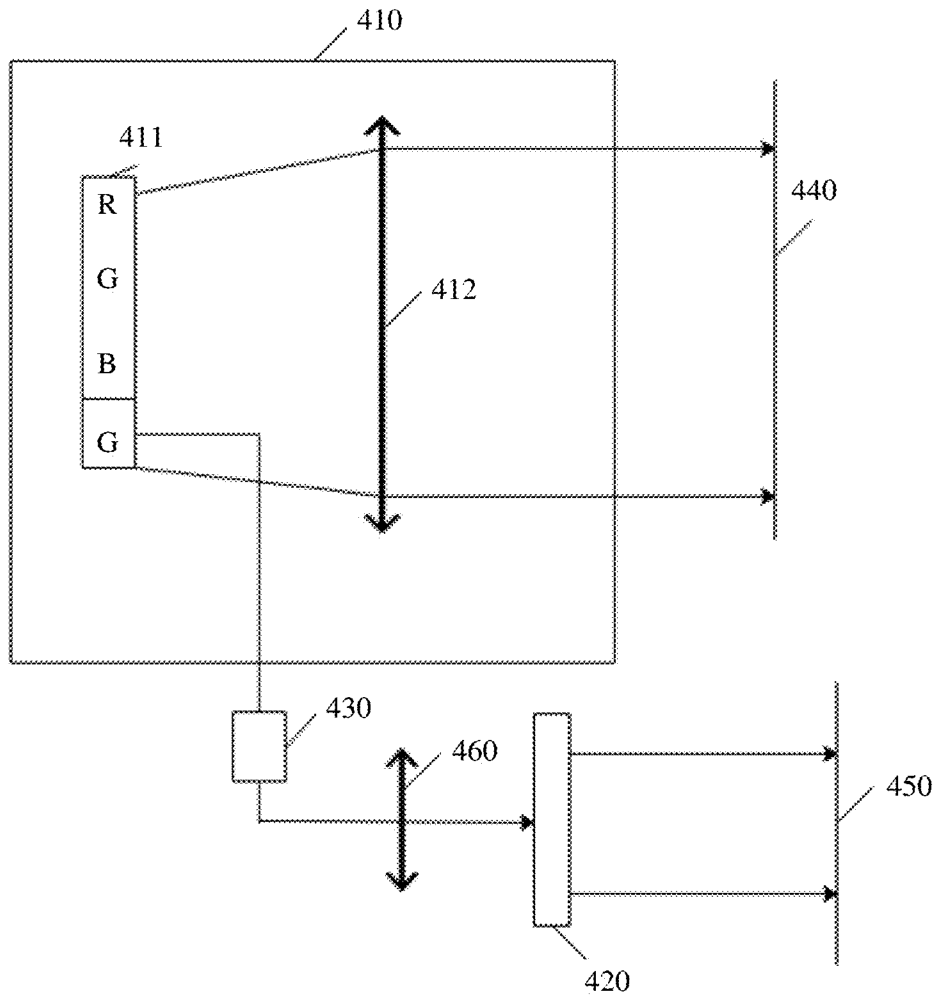
FIG. 4*a* is a schematic diagram of a structure of a multi-focal plane picture generation apparatus according to this application.

FIG. 4*a* is a schematic diagram of a structure of a multi-focal plane picture generation apparatus according to this application. As shown in FIG. 4*a*, the multi-focal plane picture generation apparatus may include a PGU module 410, a spatial light modulator 420, and an optical splitter 430. Optionally, an imaging screen 440 and an imaging screen 450 may be disposed on different focal planes of the multi-focal picture generation apparatus. For example, the imaging screen 440 is located on a focal plane 1, and the imaging screen 450 is located on a focal plane 2. The PGU module 410 may include an amplitude imaging unit 411 and an imaging component 412. The amplitude imaging unit 411 may include a monochromatic light source or a polychromatic light source. For example, FIG. 4*a* shows an R, G, and B tri-color light source. The imaging component 412 may include a lens or lens group. The spatial light modulator 420 may be implemented based on microelectromechanical systems (MEMSs) or based on liquid crystal. For example, liquid crystal on silicon (LCoS) is a spatial light modulator implemented based on liquid crystal. On an optical path, the imaging component 412 is configured to perform imaging on a light beam generated by the amplitude imaging unit 411, to form a picture onto the imaging screen 440. On another optical path, the optical splitter 430 performs optical splitting on any one or more of R, G, and B light sources. FIG. 4*a* shows that optical splitting is performed on the G light source. In addition, optical splitting may be performed on the R, G, and B tri-color light source in a time division multiplexing manner. Optionally, to reduce a diffusion loss of a light beam split off by the optical splitter 430, the light beam split off by the optical splitter 430 may be collimated by using an imaging component 460, and then irradiated onto a surface of the spatial light modulator 420. Alternatively, a polarizer (not shown in the figure) may be disposed in front of the spatial light modulator 420, to align a polarization state of a light beam incident onto the surface of the spatial light modulator with an alignment layer direction of the spatial light modulator. The imaging component 460 may be a lens or lens group. The spatial light modulator 420 may be transmissive or reflective, and phase distribution is loaded onto the surface of the spatial light modulator 420, to implement an equivalent lens function to converge light beams, thereby forming a picture onto the imaging screen 450. A position of the imaging screen 450 may be changed by adjusting an equivalent lens focal length of the spatial light modulator 420, so that the position of the imaging screen 450 can be randomly adjusted. The imaging screen 450 may be implemented by using a diffusor, a screen, white paper, or the like. The imaging screen 450 is disposed on a focal plane (or an imaging plane), and is configured to receive a picture on the focal plane.

Figure 4B:
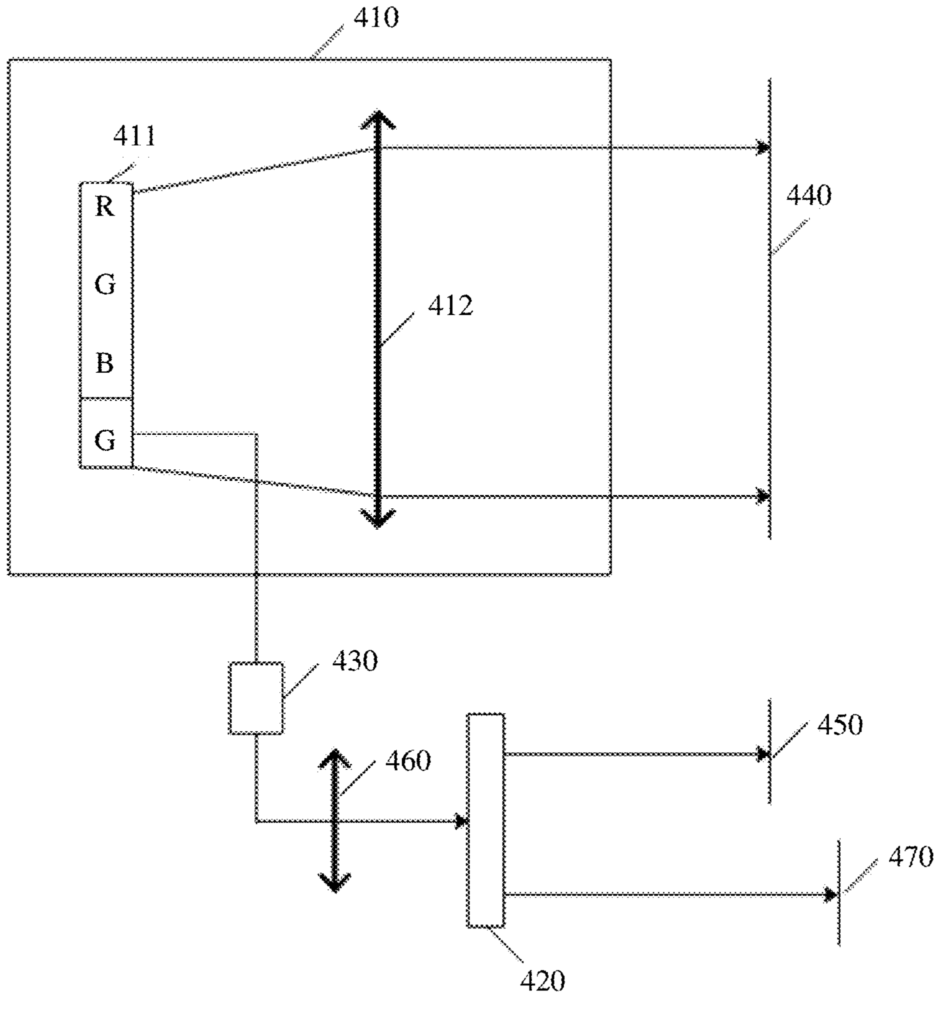
FIG. 4*b* is a schematic diagram of a structure of another multi-focal plane picture generation apparatus according to this application.

FIG. 4*b* is a schematic diagram of a structure of another multi-focal plane picture generation apparatus according to this application. As shown in FIG. 4*b*, a difference from FIG. 4*a* lies in that an imaging screen 470 is added behind the spatial light modulator 420. The imaging screen 450 and the imaging screen 470 may be two independent elements or may be integrated together, but are located at different spatial positions. Similar to the imaging screen 450, a position of the imaging screen 470 may also be adjusted by adjusting an equivalent lens focal length of the spatial light modulator 420.

In this embodiment of this application, a focal length position is flexibly adjusted by using the spatial light modulator, so that continuous adjustability of any focal length can be implemented, and any quantity of focal planes (or imaging planes) and a focal plane at any position can be implemented.

The following describes, with reference to specific examples, a principle of adjusting a position of an imaging screen by a spatial light modulator. FIG. 5*a* and FIG. 5*b* are diagrams of phase distribution of Fresnel lenses according to this application. When the phase distribution that is of the two Fresnel lenses of different focal lengths and that is shown in FIG. 5*a* and FIG. 5*b* is separately loaded onto a surface of a spatial light modulator, two different focal planes may be formed, that is, a position of an imaging screen may be adjusted to two different focal planes. The phase distribution of the Fresnel lens is loaded onto the surface of the spatial light modulator to control a light field. This is equivalent to a lens function. A radius of an $m^{th}$ ring of a Fresnel phase is $rm=(2mf\lambda)^{1/2}$, where $\lambda$ is a wavelength of incident light, and f is an equivalent lens focal length in a phase of the $m^{th}$ ring. It can be learned that different phase distribution is loaded onto the spatial light modulator, so that functions of lenses of different focal lengths can be implemented, to adjust positions of a focal plane and the imaging screen.

FIG. 6*a* and FIG. 6*b* are schematic diagrams of bifocal plane imaging according to this application. In actual application, one focal plane may be fixed, and a focal length of a Fresnel lens may be randomly adjusted to construct an adjustable bifocal plane. FIG. 6*a* shows pictures generated for a letter A and a letter B on different focal planes, and the letter A looks clearer than the letter B. In this case, to clearly observe both the letter A and the letter B, the letter A and the letter B may be separately imaged on different imaging screens (for example, the imaging screen 450 and the imaging screen 470). FIG. 6*b* shows pictures of a letter A and a letter B on a same focal plane, and definition resolution of the letter A is roughly the same as that of the letter B. In this case, both the letter A and the letter B can be clearly observed on a same imaging screen (for example, the imaging screen 450).

Figures 7A, 7B, 7C, 7D:
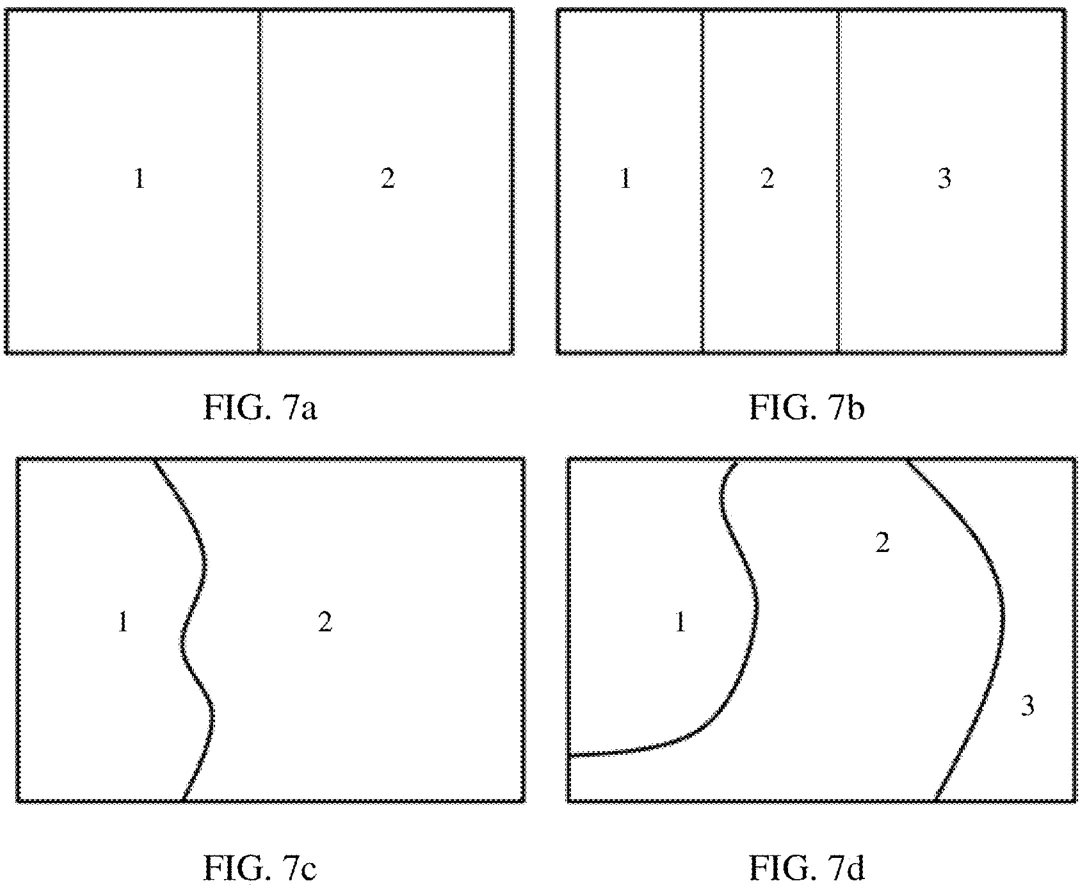
FIG. 7*a* to FIG. 7*d* are schematic diagrams of four imaging area division manners of a spatial light modulator according to this application.

The surface of the spatial light modulator may be further divided into imaging areas, and different phase distribution is loaded in different imaging areas, to form different focal planes. FIG. 7*a* to FIG. 7*d* are schematic diagrams of four imaging area division manners of a spatial light modulator according to this application. An imaging area of the spatial light modulator may be divided into a plurality of imaging areas of any quantity, any shape, and any focal length in a software configuration manner. An imaging area quantity, shape, and focal length may be determined based on an environmental factor (for example, a car, a pedestrian, or a road condition) in a car traveling process, so that different information is imaged on different focal planes. As shown in FIG. 7*a*, a surface of the spatial modulator is divided into two rectangular areas. As shown in FIG. 7*b*, a surface of the spatial light modulator is divided into three rectangular areas. As shown in FIG. 7*c*, a surface of the spatial light modulator is divided into two irregular areas. As shown in FIG. 7*d*, a surface of the spatial light modulator is divided into three irregular areas. In addition to the division manners shown in FIG. 7*a* to FIG. 7*d*, the surface of the spatial light modulator may be alternatively divided into N imaging areas, where the imaging area is square, fan-shaped, triangular, round, polygonal, or the like. A pattern of a grayscale of 0 to 255 (corresponding to a phase depth of 0 to $2\pi$) is loaded onto the surface of the spatial light modulator, and phase distribution of a lens of a different focal length may be loaded in each imaging area. For example, phase distribution of a Zernike lens or phase distribution of a Fresnel lens is loaded in each imaging area of the spatial light modulator, and the phase distribution may be implemented by using a holographic imaging function, such as a Zernike function or a Fresnel lens function. Different focal planes are generated in different areas, and a picture formed on each focal plane may be a 2D picture. The area of the spatial light modulator may be divided by using software, supports any boundary shape, and has high flexibility.

Figure 8:
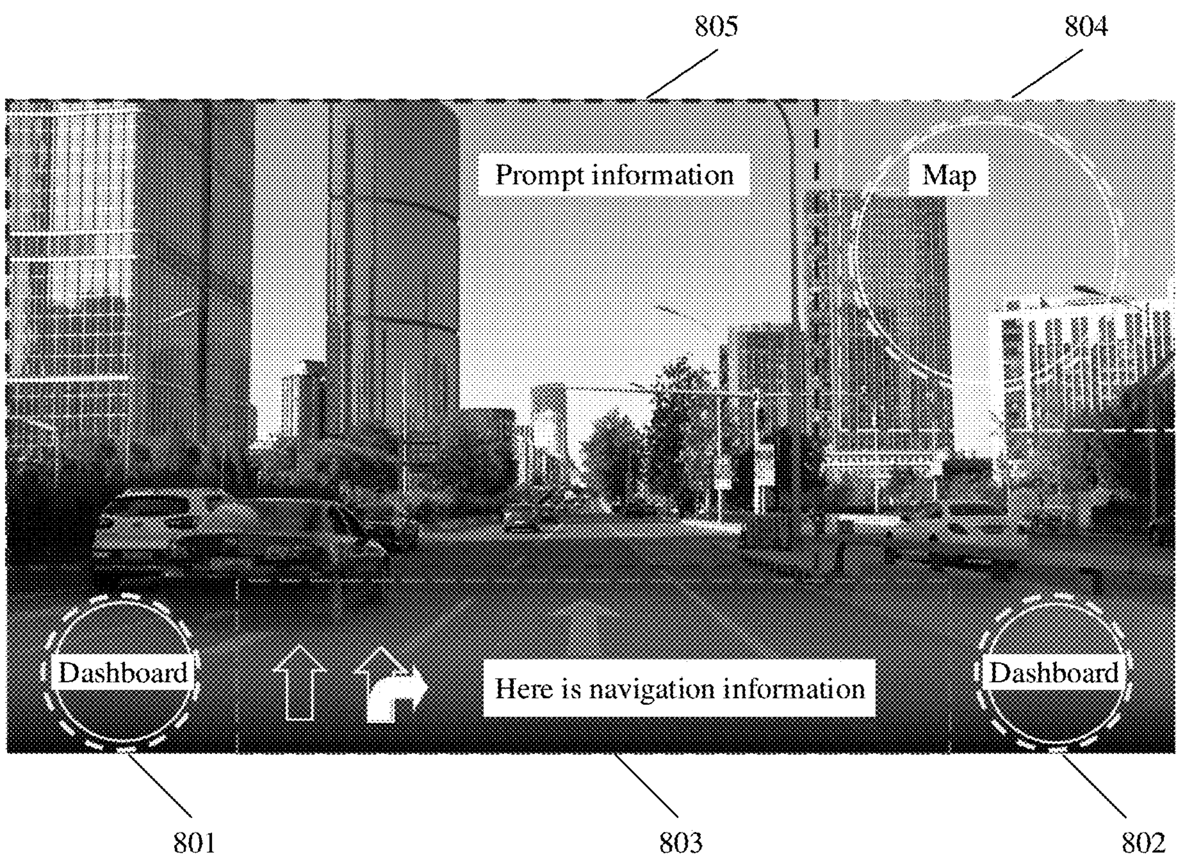
FIG. 8 is a schematic diagram of an imaging plane area division manner according to this application.

FIG. 8 is a schematic diagram of an imaging plane area division manner according to this application. As shown in FIG. 8, a spatial position in front of a human eye may be divided into a plurality of imaging plane areas, and different imaging plane areas may be located at different spatial positions. A surface area of a spatial light modulator is divided in a manner similar to those shown in FIG. 7*a* to FIG. 7*d*, and different phase distribution is loaded in different areas, to generate different imaging planes (or focal planes). For example, a dashboard 801 and a dashboard 802 are imaged at a position of 30 cm to 40 cm in front of the human eye, navigation information 803 is imaged at a position of 2 m to 3 m in front of the human eye, a map 804 is imaged at a position of 3 m to 5 m in front of the human eye, and prompt information (for example, weather or a surrounding building) 805 is imaged at a position of 5 m to 10 m in front of the human eye. Area division is performed on the surface of the spatial light modulator, and different phase distribution is loaded in different areas, so that pictures on different focal planes are displayed in different areas.

In this embodiment of this application, different phase information is loaded onto the spatial light modulator in an area division manner, to control a focal plane quantity and position, thereby achieving relatively high flexibility. Therefore, any quantity of focal planes (or imaging planes) and a focal plane at any position are implemented.

Figure 9:
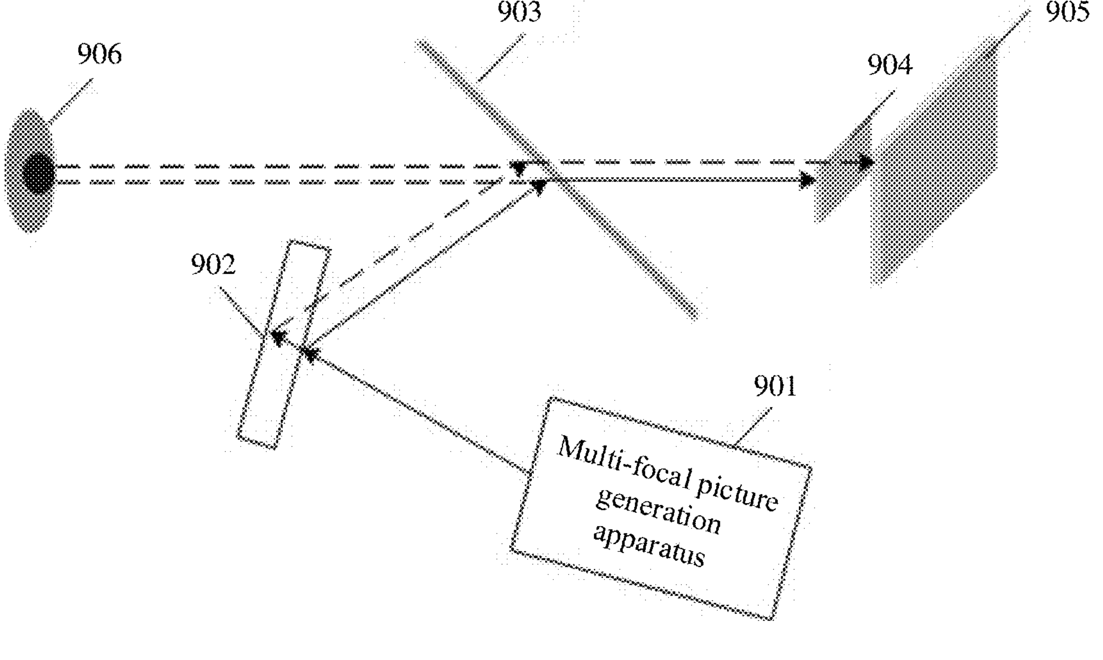
FIG. 9 is a schematic diagram of a structure of an HUD according to this application.

The multi-focal imaging apparatus in the figure in the embodiments of this application may be applied to a display device, such as an HUD, a projector, or a flat glass display. The HUD is used as an example for description. FIG. 9 is a schematic diagram of a structure of an HUD according to this application. As shown in FIG. 9, the HUD may include the multi-focal picture generation apparatus 901 in any one of the foregoing embodiments and an imaging screen 902. The multi-focal picture generation apparatus 901 has a plurality of focal planes, and is configured to generate a plurality of pictures. Different pictures are formed on different focal planes. The imaging screen 902 may include a diffusor, a screen, white paper, or the like. The imaging screen 902 is disposed on a focal plane, and is configured to receive pictures that are on different focal planes and that are generated by the picture generation apparatus 901. Pictures on different focal planes may be received by using one imaging screen, or pictures on a plurality of focal planes may be respectively received by using a plurality of imaging screens (one imaging screen corresponds to one focal plane). Optionally, an optical element, such as an optical path folding mirror or a reflector, may be disposed behind the imaging screen 902, and is configured to project, onto a windshield 903, light beams reflected by imaging planes on the imaging screen, so that virtual pictures (or pictures) 904 and 905 formed on the windshield are received by a human eye 906. A focal length of the multi-focal picture generation apparatus 901 is continuously adjustable, so that different imaging planes are generated at different positions of a same imaging screen or on a plurality of imaging screens at different positions, and finally the human eye observes pictures at different distances.

The HUD provided in this application may be applied to a driving device, such as a car, a bus, or an airplane, or may be applied to a plurality of types of AR display scenarios. When the HUD is applied to a driving device, the HUD may be mounted in an operator cabin of the driving device, and a picture generated by the HUD is reflected to a human eye by using a windshield of the driving device.

The multi-focal picture apparatus in this embodiment of this application is applied to the HUD, so that a focal length of the HUD is continuously adjustable, and different information can be presented on different imaging planes. Therefore, a user does not need to frequently adjust a focus in a driving process, thereby improving user experience.

In the descriptions of this specification, specific features, structures, materials, or characteristics may be combined in a proper manner in any one or more of embodiments or examples.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A picture generation apparatus, comprising:

an optical system comprising a tri-color light source and one or more lenses, wherein the tri-color light sources comprises a red light source, a green light source, and a blue light source;

a set of optical splitters; and a set of spatial light modulators (SLMs), wherein the optical system is configured to generate a first focal plane of the picture generation apparatus;

each optical splitter of the set of optical splitters is configured to: perform optical splitting on one of the red, green, and blue light sources, and irradiate a light beam obtained through optical splitting onto a surface of a corresponding SLM of the set of SLMs; and each SLM of the set of SLMs is configured to perform focal length adjustment on the light beam irradiated onto the surface of the SLM to generate a plurality of second focal planes of the picture generation apparatus, wherein the SLM comprises a plurality of image areas, and different phase information is loaded in the different imaging areas to generate different second focal planes as the plurality of second planes, wherein the different phase information corresponds to the different second focal planes.

2. The picture generation apparatus according to claim 1, wherein the plurality of second focal planes generated by each SLM of the set of SLMs are a plurality of consecutive focal planes.

3. The picture generation apparatus according to claim 1, wherein at least one of a quantity, a shape, or a focal length of the plurality of imaging areas is dynamically configurable.

4. The picture generation apparatus according to claim 1, wherein optical splitter is configured to split a light beam generated by the light source.

5. A display apparatus, comprising the picture generation apparatus according to claim 1 and a second optical system comprising one or more lenses, wherein the picture generation apparatus is configured to generate a first picture corresponding to the second focal plane; and the second optical system is configured to perform imaging on the first picture to generate a second picture.

6. The display apparatus according to claim 5, wherein the display apparatus further comprises an imaging screen, and the imaging screen is disposed on a focal plane of the picture generation apparatus.

7. A driving device, comprising:

an operator cabin;

a windshield mounted in the operator cabin; and the display apparatus according to claim 5, wherein the display apparatus is mounted in the operator cabin, and the windshield projects the second picture generated by the display apparatus.

8. The display apparatus according to claim 5, wherein the picture generation apparatus is configured to generate a plurality of first pictures corresponding to a plurality of second focal planes; and wherein the second optical system is configured to perform imaging on the plurality of first pictures to generate the second picture.

9. The driving device according to claim 5, wherein the display apparatus is configured to generate the second picture based on a plurality of first pictures.

10. A picture generation method, comprising:

generating a first focal plane by using an optical system, wherein the optical system comprises a tri-color light source and one or more lenses, wherein the tri-color light sources comprises a red light source, a green light source, and a blue light source;

performing optical splitting on each of the red, green, and blue light sources by using an optical splitter of a set of optical splitters, and irradiating, for each of the red, green, and blue light sources, a corresponding light beam obtained through optical splitting using the optical splitter onto a surface of a spatial light modulator (SLM) of a set of SLMs; and performing focal length adjustment on each light beam irradiated onto the surface of the corresponding SLM by using the SLM to generate a plurality of second focal planes of a picture generation apparatus, wherein the SLM comprises a plurality of imaging areas, and different phase information is loaded in the different imaging areas to generate different second focal planes as the plurality of second planes, wherein the different phase information corresponds to the different second focal planes.

11. The method according to claim 10, wherein the plurality of second focal planes generated by each SLM of the set of SLMs are a plurality of consecutive focal planes.

12. The method according to claim 10, wherein the method comprises:

dividing each SLM of the set of SLMs into the plurality of imaging areas, wherein different imaging areas correspond to different second focal planes.

13. The method according to claim 12, wherein at least one of a quantity, a shape, or a focal length of the plurality of imaging areas is dynamically configurable.

* * * * *